Nov. 12, 1929.                    G. S. MORISON                    1,735,616
                            EPICYCLIC BALL TRANSMISSION
                              Filed July 23, 1926           2 Sheets-Sheet 1
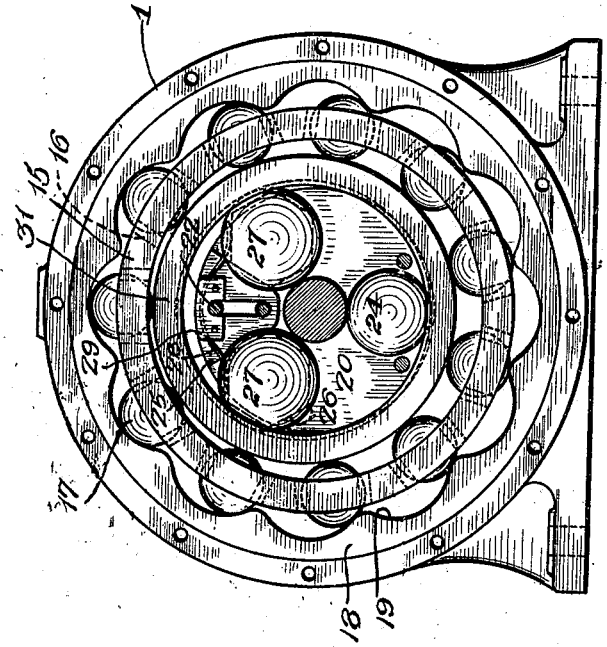
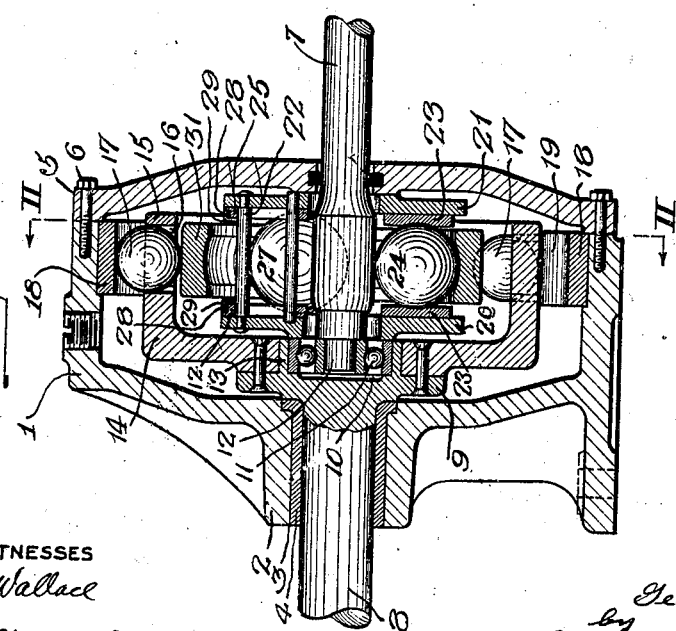
WITNESSES
INVENTOR Nov. 12, 1929.   G. S. MORISON   1,735,616
EPICYCLIC BALL TRANSMISSION
Filed July 23, 1926   2 Sheets-Sheet 2
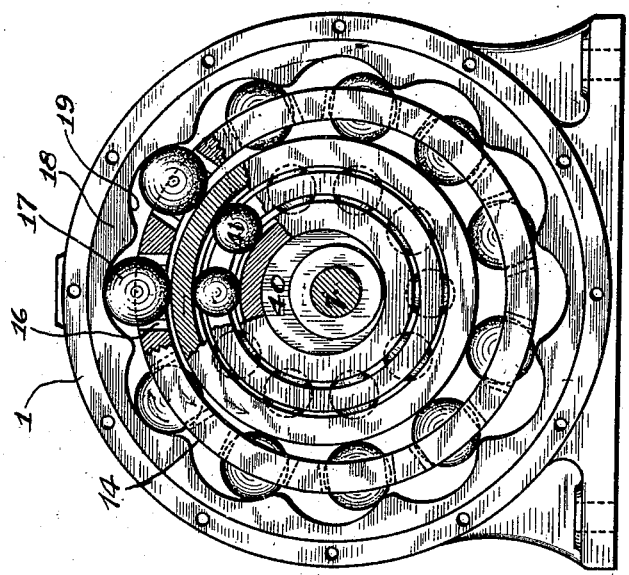
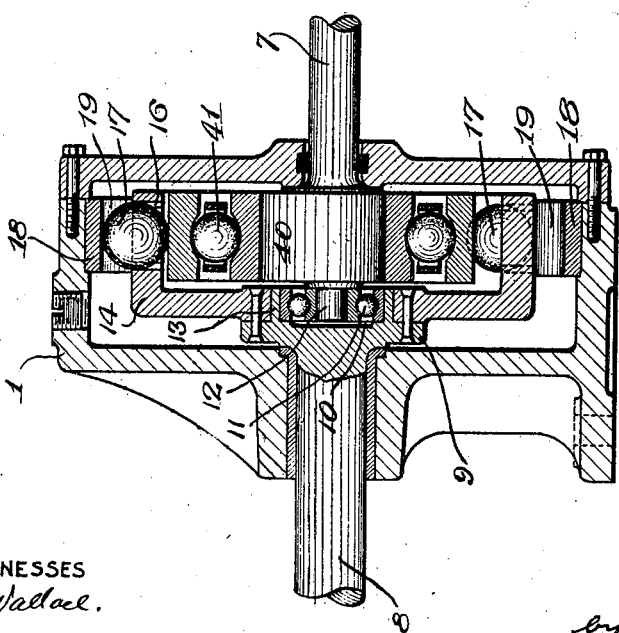
WITNESSES  
INVENTOR  
George S. Morison Patented Nov. 12, 1929

1,735,616

UNITED STATES PATENT OFFICE

GEORGE SMITH MORISON, OF PITTSBURGH, PENNSYLVANIA, ASSIGNOR TO MORISON INCORPORATED, OF PITTSBURGH, PENNSYLVANIA, A CORPORATION OF DELAWARE

EPICYCLIC BALL TRANSMISSION

Application filed July 23, 1926. Serial No. 124,352.

This invention relates to power transmissions, more particularly to gearless transmission systems for effecting a reduction of speeds in a pair of cooperatively rotating machine elements.

It is among the objects of this invention to provide a speed reduction transmission embodying a plurality of roller transmitting mechanisms that are associated with a driving and a driven element and are adapted to cooperate through an eccentrically rotatable race-way which acts upon the rollers of one of the transmission members to effect a radial thrust of the rollers against a fulcrum member having a corrugated face thereby producing a relatively great reduction in the speeds of the driving and driven elements.

Another object of this invention is to provide a speed reduction transmission of simple and compact mechanical construction which shall be positive in its transmission of power between a driving and a driven element and which shall be of relatively high efficiency for the reduction in speeds effected in comparison with gear transmitting mechanisms of like capacity and for effecting similar reductions of speeds.

Another object of this invention is to provide a speed reduction mechanism of the above designated character which shall be embodied in a housing member to constitute a self-contained unitary member that is readily applicable for use to a large variety of apparatus in which it is desired to effect a substantial reduction in the respective speeds of a driving and a driven shaft and in which the housing and transmission mechanism is designed to be readily accessible for the inspection and renewal of the several operating parts.

In a copending application Serial No. 117,167 filed June 19, 1926 is described a ball transmission mechanism utilized as a speed reduction unit in which the transmitting element between the driving and driven elements comprises a plurality of balls of different diameters forming a wedge between the driving shaft and an eccentrically movable ring having a concentric race-way, the balls being retained in a cage member which is secured to or formed integrally with the driven shaft and adapted to rotate therewith. In that transmission mechanism an eccentrically movable ring is restrained against rotary movement, constituting the ball retaining cage a planetary member and providing a speed reduction between the driving and driven elements which is increased by 1 above the ratio determined by the difference in the diameters of the balls and ball race inside the eccentric ring and of the driving shaft with which the balls are engaged.

In one form of the present invention the ball transmission is utilized in substantially the same manner as described in the above mentioned application with the exception that the eccentrically movable ring is not positively restrained against movement. The eccentric movement of the ring is herein utilized to produce an epicyclic or progressive thrust movement with respect to an encircling fulcrum member thereby pushing or rolling a plurality of circular rolling members associated with a second cage member into the corrugations of the stationary fulcrum member to effect a driving of the roller-carrying cage and consequently a relatively great reduction of speed between the driving and the driven shaft, the latter being rotatably secured or formed integrally with the cage or ball-retaining member.

An advantage of the transmission device constituting a preferred form of the present invention resides in an improvement in the manner of holding the balls of the inner transmission in angular spaced relation and of yieldingly urging one of the ball members into the wedge-space formed by the eccentric disposition of the outer race with respect to the inner driving shaft, the mounting of the balls being such that the device may be operated in either direction of rotation.

The outer ball transmission employed in the instant case functions somewhat on the principle of a wabble gear, which is an eccentrically movable gear cooperatively engaged with an internal gear and having a difference in tooth ratio determined by the reduction in speed it is desired to obtain.

One of the objects of using the ball transmission is to obtain smoothness of operation to eliminate sound produced by resonance set up by the vibration resulting from the interaction of imperfectly formed gear teeth. In addition, the ball transmission lends itself to a stable and substantially rigid construction having no unbalanced masses in the rotating elements.

Although balls are illustrated herein and named as the rolling elements, rollers of other shapes, as for example cylinders, may be used, and the invention is not limited to the specific rollers illustrated.

In the accompanying drawing constituting a part hereof, and in which like reference characters designate like parts, Fig. 1 is a vertical sectional view partially in elevation of a speed reduction transmission embodying the principles of this invention; Fig. 2 is an end elevational view thereof taken along the lines II—II, Fig. 1; and Figs. 3 and 4 are respectively a vertical sectional and end elevational view of a modified form of the invention in which the drive shaft is provided with an eccentric to take the place of the inner ball transmissions.

Referring to the several figures of the drawing, the structure therein illustrated comprises a housing member 1 having a projecting end portion 2 provided with a central opening 3 for receiving a journal bearing 4. An end bracket 5 is secured to the open end of the housing by suitable bolts 6. A plurality of shafts 7 and 8 comprising respectively a driving and a driven shaft are journalled for rotation in coaxial alignment within the housing in the following manner. The shaft 8 which is provided with a flange 9 is journalled in the bushing 4 in the housing member. The shaft 8 is provided with a recess 10 having a ball bearing 11 secured therein for journalling the extended end 12 of the drive shaft 7.

The flange 9 of the shaft 8 is provided with an offset portion 13 adapted to seat a cage member 14 having an axially extending flange 15 provided with recesses 16, Fig. 2, for receiving a plurality of balls or rollers 17. An orbital or fulcrum member 18 comprising a ring having a corrugated inner face 19 is secured in the housing member in alignment with the rollers 17 of the member 14. The corrugations of the fulcrum member 18 are bounded by arcs of equal circles the radii of which are respectively equal to the diameters of the rollers 17 with which they are engaged.

An inner cage comprising a pair of discs 20 and 21 constituting floating members around the shaft 7 and secured in spaced relation by rods or rivets 22, is provided with bearing pads 23 having suitable seating depressions for securing balls or rollers 24. The cage member is further provided with a stop member 25 of substantial V-shape, Fig. 2, and a plurality of hexagonally-shaped bearing pads 26 that are freely movable within the cage. Ball or roller members 27 are inserted between oppositely disposed pads 26 and the latter are adapted to engage the diverging faces of the stop 25. A spring 28 is secured by a cover plate 29 to the stop 25, as shown, and is formed to engage the hexagonal faces of the pads 6 to yieldingly urge the latter away from the sides of the member 25, so as to insure the balls 27 being held in gripping position in the transmission. The roller members 24 and 27 are of different sizes, consequently the ring 31 has an eccentric disposition with respect to the shaft 7, the cage member 15 and the fulcrum member 18, all of which are concentric. The ring 31 is free to rotate in either direction.

The operation of this roller transmission speed reduction mechanism is briefly as follows: The inner shaft 7 is coupled to a suitable prime mover or driving member through which it is actuated to revolve the rollers 24 and 27 of the inner transmission, and the latter by virtue of the spring 28 are forced into the converging space between the surfaces of the shaft 7 and of the inside of eccentric ring 31. One or the other of the roller members 27 is urged into the narrowing space between the shaft and ring members by the spring member 28, depending upon the direction of rotation of the shaft 7. This wedging effect produces a positive transmission of power from the drive shaft 7 through the rollers 24 and 27 to the eccentric ring 31 which is subjected to an epicyclic movement with respect to the corrugated fulcrum member 18. The roller members 17 by virtue of their engagement with the outer face of the eccentric ring 31 are progressively pushed into the corrugations of the member 18 causing them to rotate about axes parallel to the axis of the drive shaft 7 thereby advancing the rollers in the direction opposite the direction of rotation of the drive shaft 7. The cage member 14 carrying the rollers 17 being secured or formed integrally with the driven shaft 8 is carried by the rollers in the direction of their travel on the corrugated path of member 18. The rollers constitute the medium by which power or rotary movement is transmitted from the drive shaft 7 to the driven shaft 8. The epicyclic movement of the ring 31 effects a progressive successive radial thrust of the several rollers 17 against the corrugated face of the fixed outer member 18 and this effects a forward rolling movement of the members 17, which carry cage 14, so that the effect is to slowly rotate the cage 14 carrying the rollers.

The number of rollers carried by the cage member 14 is always less than the number of depressions or corrugations in the fulcrum 18 and normally one less. In the illustration there are twelve corrugations in the fulcrum member 18 and eleven rollers carried by the cage member 14, which provides a twelve-to-one reduction in the speed of the driven shaft 8 as compared to the number of individual complete thrusts of the eccentric 31 upon any one of the rollers 17. Since the eccentric movement and consequent radial thrust of the ring 31 is effected through the unequally sized rollers 24 and 27 revolving about the driven shaft, and since this arrangement itself produces a reduction in speed as between rotations of the drive shaft and eccentric thrusts of the ring on any one radius line, there is an additional reduction of speed depending upon the dimension of the shaft 7, rollers 24 and 27, and the diameter of the inner face of the ring 31.

The reduction in speed between shafts 7 and 8 is therefore dependent upon the length of radial thrust of the eccentric, the size of the balls 17 and number of corrugations in track 18, as well as the elements inside the eccentric ring. By varying these elements within the possible ranges, a wide variation in speed ratio between drive and driven shaft is possible. For any one device however the speed ratio is constant. The smaller the throw of the eccentric the greater the speed reduction is in a given diameter of fulcrum ring.

In the modification shown in Figs. 3 and 4, an eccentric 40 is mounted on or formed integrally with the shaft 7 and is adapted to rotate therewith. The eccentric 40 functions to produce an epicyclic movement for thrusting the rollers 17 against the corrugated path of the member 18 and consequently rolling them thereon. However, it is necessary in this construction to provide a ball bearing 41 the outer ring member of which is floatingly free to revolve as is the ring 31 in Figs. 1 and 2, and for the same reasons. The utilization of an eccentric such as the member 40 in place of the inner ball transmission shown in Figs. 1 and 2 produces less reduction in the speed of the driven shaft, but makes a simpler and cheaper construction.

A speed reduction transmission mechanism as described provides a great reduction of speed in a relatively small and compact unit as compared with other speed reduction units utilizing planetary and wabble gears, and it provides relatively smooth and silent operation, with a relatively small amount of friction, due to the use of rolling contacts of driving members.

The apparatus may be used to speed up as well as to reduce relative rotation by driving shaft 8. Shaft 7 then becomes the driven shaft and will be given very great speed multiplication.

It will be obvious to those skilled in the art that various modifications may be made in the details of construction and in the size and proportions of the several cooperating parts without departing from the principles herein set forth.

I claim:

1. A transmission device comprising in combination, a pair of coaxially aligned shafts, rollers disposed around one of said shafts in angular spaced relation, two of said rollers having unequal diameters, a free roller race disposed around and contacting with said rollers, a cage member secured to rotate with the other of said shafts having apertures provided therein, a plurality of roller members mounted in the apertures of said cage and adapted for engagement with said race, and a fixed corrugated fulcrum member disposed around and contacting with said last named rollers.

2. A transmission device comprising in combination, a pair of coaxially aligned shafts, rollers disposed around one of said shafts in angular spaced relation, two of said rollers having unequal diameters, a free roller race disposed around and contacting with said rollers, a cage member secured to rotate with the other of said shafts having apertures provided therein, a plurality of roller members mounted in the apertures of said cage and adapted for engagement with said race, and a fixed corrugated fulcrum member disposed around and contacting with said last named rollers, the corrugations of said fulcrum member being bounded by arcs of equal circles the radii of which are respectively equal to the diameters of the rollers with which they are engaged.

3. A transmission device comprising in combination, a pair of coaxially aligned shafts, rollers disposed around one of said shafts in angular spaced relation, two of said rollers having unequal diameters, a free roller race disposed around and contacting with said rollers, a cage member secured to rotate with the other of said shafts having apertures provided therein, a plurality of roller members mounted in the apertures of said cage and adapted for engagement with said race, and a fixed corrugated fulcrum member disposed around and contacting with said last named rollers, said shafts, cage and corrugated fulcrum members being concentric to each other and said roller race being adapted for simultaneous eccentric rotating revolving gyrating movement relative thereto.

4. A transmission device comprising in combination, a pair of coaxially aligned shafts, rollers disposed around one of said shafts in angular spaced relation, two of said rollers having unequal diameters, a free roller race disposed around and contacting with said rollers, a cage member secured to rotate with the other of said shafts having apertures provided therein, a plurality of roller members mounted in the apertures of said cage and adapted for engagement with said race, and a stationary corrugated fulcrum member disposed around and contacting with said last named rollers, said last named rollers being adapted for angular movement on the path of the corrugated member.

5. A transmission device comprising in combination, a pair of coaxially aligned shafts, rollers disposed around one of said shafts in angular spaced relation, two of said rollers having unequal diameters, a free roller race disposed around and contacting with said rollers, a cage member secured to rotate with the other of said shafts having apertures provided therein, a plurality of roller members mounted in the apertures of said cage and adapted for engagement with said race, and a fixed corrugated fulcrum member disposed around and contacting with said last named rollers, said first named rollers constituting wedge members between their cooperating shaft and said race, and said last named rollers being adapted for radial displacement into and out of the corrugations of said fulcrum member.

6. A transmission device comprising in combination, a pair of coaxially aligned shafts, rollers disposed around one of said shafts in angular spaced relation, two of said rollers having unequal diameters, a free roller race disposed around and contacting with said rollers, a cage member secured to rotate with the other of said shafts having apertures provided therein, a plurality of roller members mounted in the apertures of said cage and adapted for engagement with said race, and a fixed corrugated fulcrum member disposed around and contacting with said last named rollers, said roller race being adapted to wedge said first named rollers with their cooperating shaft and to progressively push said last named rollers into the corrugations of said fulcrum member, whereby to drive the cage.

7. A transmission device comprising in combination, a pair of coaxially aligned shafts, rollers disposed around one of said shafts in angular spaced relation, two of said rollers having unequal diameters, a free roller race disposed around and contacting with said rollers, a cage member secured to rotate with the other of said shafts having apertures provided therein, a plurality of roller members mounted in the apertures of said cage and adapted for engagement with said race, and a fixed corrugated fulcrum member disposed around and contacting with said last named rollers, said first named rollers being adapted to produce a wedge effect between their cooperating shaft and said roller race, and said last named rollers being of uniform diameter and freely disposed in the apertures of said cage member.

8. A transmission device comprising in combination, a pair of coaxially aligned shafts, rollers disposed around one of said shafts in angular spaced relation, two of said rollers having unequal diameters, a free roller race disposed around and contacting with said rollers, a cage member secured to rotate with the other of said shafts having apertures provided therein, a plurality of roller members mounted in the apertures of said cage and adapted for engagement with said race, and a fixed corrugated fulcrum member disposed around and contacting with said last named rollers, said first named rollers being adapted to subject the roller race to an epicyclic movement whereby the latter progressively and successively pushes said last named rollers into the corrugations of said fulcrum member.

9. A transmission device comprising in combination, a pair of relatively movable shaft members journalled for rotation in coaxial alignment, an inner and an outer cage member associated with said shafts, rollers disposed in said cage members, a ring provided with an inner and an outer race separating the rollers of said inner and outer cage members, and a fixed fulcrum member having a corrugated path for engaging the rollers of said outer cage member, two of the rollers of said inner cage having different diameters whereby to constitute said ring an eccentrically rotatable member whereby to produce a radial and rolling motion of the rollers of said outer cage to effect their engagement with the corrugated face of said fixed fulcrum member.

10. A transmission device comprising in combination, a pair of coaxially aligned shafts, rollers disposed around one of said shafts in angular spaced relation, two of said rollers having unequal diameters, a roller race disposed around and contacting with said rollers, a cage member secured to rotate with the other of said shafts having apertures provided therein, a plurality of roller members mounted in the apertures of said cage and adapted for engagement with said race, and a corrugated fulcrum member disposed around and contacting with said last named rollers, the corrugations of said fulcrum member being bounded by arcs of equal circles the radii of which are respectively equal to the diameters of the rollers with which they are engaged, said corrugations being greater in number than the number of cooperating rollers.

11. A transmission device comprising a rotary shaft having a fixed axis, a plurality of rollers mounted on the shaft and adapted to revolve freely thereabout, two of said rollers having different diameters, a ring eccentric to the shaft surrounding and bearing on said rollers, said ring being free to rotate on its axis and simultaneously to move in a path determined by revolution of its axis about the axis of the shaft, a rotatable cage coaxial with the shaft, rollers carried in the cage and free to move radially in relation thereto, and a fixed fulcrum ring member surrounding and bearing on said caged rollers, the bearing face of said fulcrum ring being formed into a series of arcuate corrugations greater in number by one than the number of caged rollers and having radii equal to the diameter of the caged rollers, whereby to transmit rotary motion between the said shaft and cage with a change of speed of rotation.

In testimony whereof, I sign my name.

GEORGE SMITH MORISON.